March 10, 1970  D. J. DE BITETTO  3,499,703
RADIATION BEAM POSITIONING APPARATUS
Filed July 8, 1966
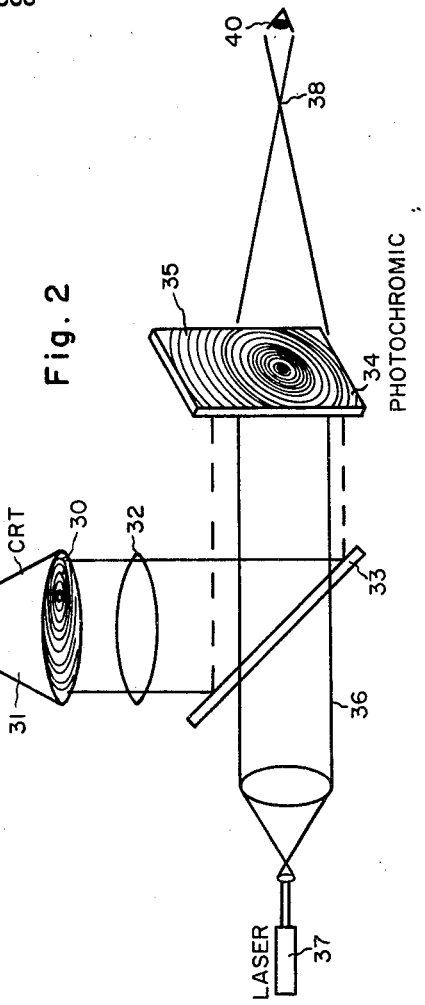
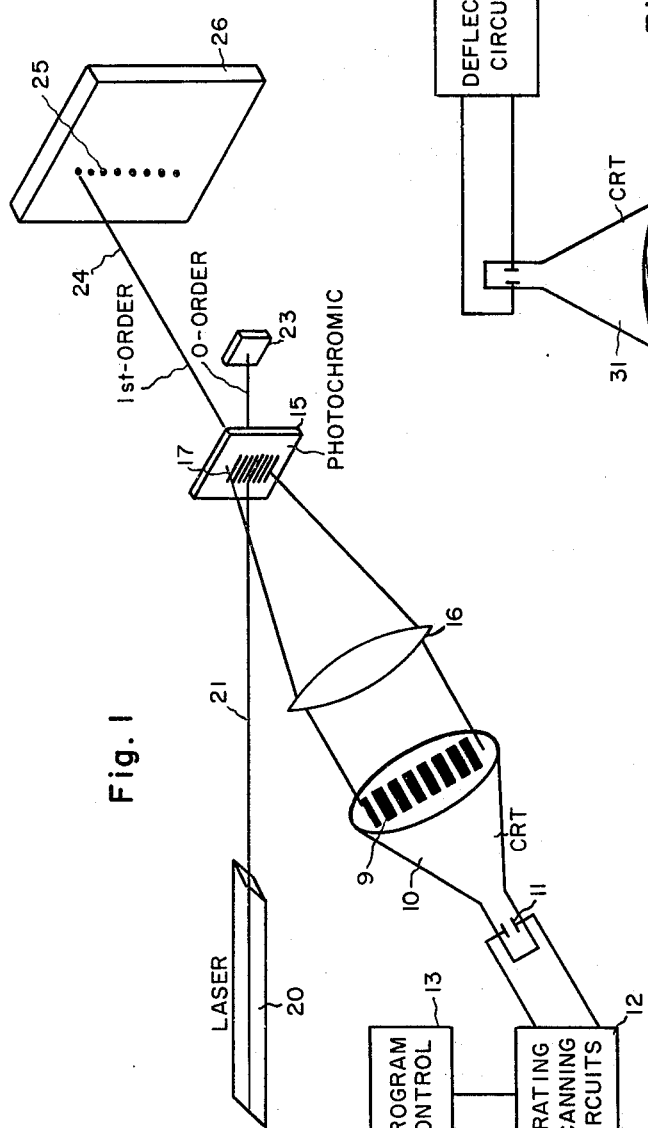
INVENTOR.
D.J. DeBITETTO
BY
AGENT

United States Patent Office

3,499,703
Patented Mar. 10, 1970

3,499,703
RADIATION BEAM POSITIONING APPARATUS
Dominick John De Bitetto, Briarcliff Manor, N.Y., assignor to U.S. Philips Co., Inc., New York, N.Y., a corporation of Delaware
Filed July 8, 1966, Ser. No. 563,886
Int. Cl. G02f 1/28, 1/36; G02b 5/18
U.S. Cl. 350—160       8 Claims

ABSTRACT OF THE DISCLOSURE

An optical beam deflection and focussing system using diffraction grating and Fresnel zone patterns generated on the face of a cathode ray tube to form similar patterns on a photochromic material placed in interfering relationship with the beam to be deflected and focused.

---

This invention relates to an electronic radiation beam positioning or focusing system, and in particular to a system for deflecting a beam of radiation or for changing the focusing distance of such a beam.

Deflection systems for radiation beams have existed in the past. The most common prior art electronic system utilized Bragg reflections by ultrasonic or acoustic waves. The waves were established by means of an ultrasonic transducer in a medium whose index of refraction is altered or controlled by the presence of the acoustic waves. The deflection angle could be changed by changing the frequency of the acoustic waves. These prior art systems, however, suffered from the difficulty that the amount of the deflection obtained by means of the acoustic waves was extremely small, and thus other optical techniques were necessary to emphasize or increase the deflection to produce a useful system. In addition, such prior art systems were inherently limited insofar as speed is concerned by the acoustic propagation velocity and frequency limitations of the transducing elements. So far as is known, there has been no prior art electronic system for changing the focusing distance of a radiation beam.

One object of my invention is an electronic beam deflection system capable of producing large angle deflections.

Another object of my invention is a beam deflection system inherently capable of high switching speeds.

Another object of my invention is an electronic system for varying the focusing distance of a radiation beam.

Still a further object of my invention is an electro-optic lens of variable focal length and variable positioning capability.

Briefly, my invention contemplates generating, by an electronic device, an optical pattern which is capable, when translated into an absorption image, of interacting with a radiation beam to modify either its position or its focusing. This optical pattern is transformed into an absorption image for the radiation beam, and the beam whose position or focusing is to be controlled is caused to interact with that absorption image. Electronic means are provided for altering the optical pattern thereby causing a similar change in the absorption image, causing the beam to change its position or focusing in the manner determined by the altered optical pattern.

In a preferred form of my invention, the pattern generator is a cathode-ray tube which is suitably activated to generate on its screen an image of a grating or of a Fresnel zone plate (FZP). I prefer to create my absorption image by imaging the pattern on the screen of the cathode-ray tube onto a layer of a photchromic material sensitive to the pattern radiation and which is thus darkened in response to the optical pattern. By the provision of suitable circuitry, the grating spacing or the Fresnel zone plate size or position is selectively changed, thereby causing the photochromic to form a new absorption image corresponding to the changed pattern presented on the screen of the cathode-ray tube, thereby altering the position or focusing of the radiation beam which is directed through or reflected off the photochromic layer.

The invention will now be described in greater detail with reference to the accompanying drawing wherein: FIG. 1 is a schematic view of the elements of a system in accordance with my invention in which beam deflection is achieved by means of a variable spacing diffraction grating; FIG. 2 is a schematic view of another system according to my invention using a Fresnel zone plate pattern.

FIG. 1 illustrates a beam deflection system utilizing a variable spacing diffraction grating in accordance with one embodiment of my invention. The system includes a cathode-ray tube 10 capable of high resolution and provided with a phosphor screen capable of generating a radiation which can establish an absorption image on a layer of photochromic material Since most photochromic materials are sensitive to ultraviolet radiation, the cathode may be provided with a P-16 or equivalent ultra-violet radiating phosphor, and preferably a quartz face plate which will transmit the ultraviolet radiation generated by such phosphor. Coupled to the deflection system of the cathode-ray tube, shown schematically as a pair of deflection plates, is a suitable circuit 12 which will cause the electron beam to draw a series of uniformly spaced, for example, horizontal lines 9 on the phosphor screen which can be described as a grating-forming raster. A suitable program circuit 13 can be provided so that the raster pattern on the face of the cathode-ray tube can be altered either selectively or on the basis of a regular periodical arrangement. With the resolution of cathode-ray tubes commercially available, a line density of up to ten lines per millimeter can easily be achieved. For the purposes of the present invention, at least about 100 lines per frame are required. It will be appreciated by those skilled in the art that to achieve a sizeable angular deflection by a grating of an ordinary radiation beam in, say, the visible region requires line spacings of the order of 0.01 mm. or less, a resolution which is presently beyond the reach of the cathode-ray tube art. In accordance with a feature of my invention, I now provide optical means for reducing the size of the pattern on the face of the cathode-ray tube thereby increasing the grating line density and projecting same onto a layer of a photochromic material 15. In its simplest form, I provide a demagnifying lens 16 for imaging the grating pattern 9 onto a photochromic 15. If ultraviolet radiation is being generated by the cathode-ray tube, the lens should be made of quartz, for example. The demagnification should be at least a factor of 10, which is easily accomplished optically.

The photochromic 15 comprises a transparent support, for example, of glass, on which a thin layer of photochromic material is provided. As is known in the art, a photochromic material is a material whose spectral absorption characteristics may be reversibly changed upon exposure to light having a particular range of wavelengths. Any of the well-known photochromic materials may be used for this purpose. Such materials become darkened when exposed to the sensitizing radiation, and when the sensitizing radiation is removed it reverts back to a colorless state. This reverison may be speeded up by exposing the photochromic to a bleaching radiation, which is generally a radiation in the red end of the visible region or in the infrared. It is of course necessary to choose a photochromic material which is not bleached by the wavelength of the radiation beam being acted on when long persistence is required, and which has the resolution capabilities required for the system of the invention, that is, an ability to resolve line spacings of the order of 1/100 mm., or 100 lines to a mm., which is easily wtihin the resolution capabilities of commercially-obtainable photochromic materials, examples of which will be later provided.

Thus, there is formed on the layer of photochromic material 15 an absorption image 17 in the form of a line pattern which is a replica of the pattern which is generated on the face of the cathode-ray tube 10. It is similar to a grating image on a transparency. As will be obvious, whenever the line pattern 9 on the face of the cathode-ray tube is altered, so will the line pattern constituting the absorption image 17 be altered.

A source 20 of a monochromatic radiation beam is provided. A laser is a preferred form of such a monochromatic light source, though it will be appreciated that any known way for producing such a monochromatic light beam is within my contemplation. The laser 20 is positioned so that its collimated beam 21 is directed to impinge on the absorption image 17 on the photochromic 15. In the form shown in FIG. 1, the laser beam 21 is shown as being transmitted through the photochromic, but it will be appreciated that it is also possible for the laser to be positioned on the opposite side of the photochromic 15 and thus be reflected from the photochromic. In a manner well known in optics, when a monochromatic beam interacts with a grating, due to the principle of interference, the light waves which pass through the grating become cancelled in certain directions and reinforced in other directions. In general, the reinforcement occurs along so-called orders which correspond to different integers of a constant M in the grating formula $d \sin \theta = M\lambda$, wherein $d$ is the line or grating spacing, $\lambda$ is the wavelength of the radiation employed, and $\theta$ is the deflection angle that the beam undergoes for each order. There is always a zero order or undeflected beam, which I intercept and block off by means of an absorber 23. The intensity of the deflections that occur for the different orders decreases as the order number increases and it is thus desirable to design the system for the low order diffracted beams. As is illustrated in FIG. 1, a portion of the beam will be deflected off of its axis as shown at 24, and the extent of that angular deflection will depend upon the grating spacing of the absorption image. Thus, by varying the grating pattern on the cathode-ray tube, and thus the grating spacing of the absorption image on the photochromic, the beam 24 can be caused to scan a line 25 in the plane determined by the zero order beam and the beam 24 on a remote projection screen 26, for example. Thus, the system illustrated in FIG. 1 can be employed as a display system. It will be further appreciated that there are many other uses for such beam deflection systems. For instance, the system can be used for reading-in information into an optical store, examples of which have been described in detail in the prior art wherein the storage medium may be, for instance, a photographic or photochromic material. Similarly, the system can be used for reading-out information present in such an optical store. In a display system, it will be recognized that only a line scanning system has been described. To obtain deflection in the transverse direction, in the usual two-dimensional display arrangement, another system can be provided in series with the system illustrated for obtaining a deflection at right angles thereto. Alternatively, a mechanical scanner can be employed for the transverse scanning.

FIG. 2 illustrates one form of my invention as an electro-optic lens with variable focus or variable position. As will be observed, the system is essentially similar to that illustrated in FIG. 1, except for the pattern that is generated by the cathode-ray tube and the absence of the demagnifying lens 16. In this arrangement, I generate on the face plate of the cathode-ray tube a Fresnel zone plate (FZP) pattern. As is known in the art, a Fresnel zone plate operates as a lens for a monochromatic radiation beam. In other words, if a collimated beam is caused to pass through a Fresnel zone plate having a pattern of the type illustrated in FIG. 2, then the beam will become focused at some remote place in space which depends upon the ring spacing in the specific example given of the zones in the Fresnel zone plate. By altering the ring spacing, the focal length of the lens constituted by the Fresnel zone plate can be altered. For example, a pattern composed of 40 Fresnel rings with an overall diameter of 5 inches results in a focal length of approximately 1/3 mile for 6000 A. radiation. The same 40 ring pattern reduced in diameter to approximately 10 mm. will produce a focal length of about 20 inches.

In this embodiment of the invention, a Fresnel zone plate pattern is generated on the phosphor screen 30 of the cathode-ray tube 31, and that pattern then optically projected 32 via a semi-reflecting plate 33 (demagnification is not necessary), onto a photochromic plate 34 to form a corresponding absorption image 35. Then a collimated monochromatic beam 36 from, for example, a laser 37 is directed so as to be transmitted normally through the photochromic 34 causing the beam to focus to a point 38 beyond the plate as determined by the Fresnel ring pattern. Altering that pattern electronically on the phosphor screen of the cathode-ray tube 31 will cause the monochromatic beam's focal length also to be correspondingly varied. Similarly, shifting the Fresnel zone plate pattern on the screen of the cathode-ray tube, without changing its size, by the application of simple potentials to the deflection plates, will cause the position, but not the focal length, of the focused light to be shifted by a corresponding amount. This is equivalent to a deflection of the beam, which is attained hereby shifting the pattern of the Fresnel rings. By properly programming 39 the cathode-ray tube to generate rapidly a sequence of Fresnel zone ring patterns in size and position in accordance with the principles enunciated above, the resultant optical beam 36 can be caused to produce a sequence of points 38 synthesizing a three-dimensional image in space. And if this image were continuously reproduced by the same system, then a viewer 40 would be able to observe such a three-dimensional image. The programming can be provided by suitable circuitry. Alternatively, a Fresnel zone pattern may be derived by using a television camera to pick-up an image of an actual FZP and the video signal generated by the camera used to activate the cathode-ray tube, similar to any closed circuit television system. Changes in the Fresnel ring pattern can be provided by recording different size patterns on video tape, and using the tape to actuate the cathode-ray tube, or by varying the pain of the deflection amplifiers in the system to change the image size and thus the ring spacing. For beam positioning only, suitable deflection circuitry can be provided for simply shifting the zone pattern on the face of the cathode-ray tube to cause a shift of the beam as described above.

The photochromic materials useful in the apparatus of my invention may be chosen from any of the well known organic or inorganic compounds that exhibit the property known as photochromism, which means a material which shows a reversible color or optical density change in response to some radiation, usually in the ultraviolet range. Reversible organic photochromics such as spiropyrans, stilbenes, anils and azo compounds may be used, generally in a form in which they are thinly coated onto a transparent glass or plastic substrate. Among useful inorganic photochromic materials are those developed by Corning Glass Works comprising a borosilicate glass containing silver halide crystals, which appear to be very suitable because of their lack of fatigue, thus permitting long-time cycling (see U.S. Patent 3,208,860). The latter materials also have the advantage that they are highly transparent in the unsensitized condition, whereas the activated photochromic glass shows strong absorption between 450 and 550 millimicrons, a spectral range in which monochromatic beams from lasers are readily available. As a result, it will be possible to establish on a photochromic plate constituted of such a material a relatively high difference in absorption between the darkened areas corresponding to the grating lines and the clear areas corresponding to the line spaces. In addition, the resolution of these materials is adequate to easily meet the 0.01 mm. figure mentioned above as necessary to obtain adequate interaction with the beam. Where it is intended that the monochromatic beam, whose deflection or focus is to be effected, is to be continuously transmitted through the absorption image on the photochromic, then it is desirable to choose a photochromic whose decay time is at least as long as that of the phosphor on the cathode-ray tube so that the pattern will persist between frames. For synthesizing a 3-dimensional image in space, many FZP patterns may be superimposed on the photochromic at one time. Of course it will be understood that the laser beam can be a pulsed beam, i.e., digitalized, rather than continuous.

As will be evident, I prefer to choose the grating dimensions so as to utilize the first order diffracted beam from the photochromic, which is relatively intense and which will still afford a wide range of angles of deflection, for example, up to 30° for a grating line spacing of 0.001 mm. The second and higher orders which also could be fairly intense can be reduced or eliminated by a proper choice of the line spacing to line width of the pattern on the cathode-ray tube or by giving the grating line profile a cosinisoidal variation, as is well known in the grating art.

What is claimed is:
1. A radiation beam positioning system comprising:
means for converting a real image into an absorption image,
electronic-optical means for generating and displaying a real image of an optical diffraction pattern,
optical means for projecting said image onto said converting means whereby the resulting absorption image will be of a size to diffract light,
means for generating a substantially monochromatic radiation beam and for directing said beam to impinge on the absorption image whereby the radiation beam after interaction with the absorption image is diffracted, and
electronic modifying means coupled to said electronic-optical generating means for altering the generated pattern to cause a change in the extent to which said radiation beam is diffracted.

2. A system as set forth in claim 1 wherein the electronic generating means comprises means for producing a diffraction grating.

3. A system as set forth in claim 1 wherein the pattern generating means comprises means for producing a Fresnel zone plate pattern.

4. A system as set forth in claim 1 wherein the converting means is a photochromic material.

5. A radiation beam positioning system, comprising means including a cathode ray tube for and displaying a real image of an optical diffracting pattern, a photochromic material, means for imaging said pattern on said photochromic material to produce on said photochromic material an absorption image which is a replica of said pattern, means for generating a monochromatic radiation beam and directing the beam through the absorption image on the photochromic layer, whereby the radiation beam after interaction with the pattern is diffracted, and electronic modifying means connected to said electronic-optical generating means for altering the generated pattern to cause a change in the extent to which said radiation beam is diffracted.

6. A system as set forth in claim 5 wherein the optical pattern is a diffraction grating pattern, means are provided for reducing the pattern when projecting same onto the photochromic layer, and the modifying means includes means for varying the grating spacing of the optical pattern thereby to cause the transmitted beam to undergo an angular deflection determined by the grating spacing.

7. A system as set forth in claim 5 wherein the optical pattern is a Fresnel zone plate pattern, and means are provided to shift the pattern and thereby cause the transmitted beam to be displaced.

8. A system as set forth in claim 5 wherein the optical pattern is a Fresnel zone plate pattern, and means are provided to change the pattern spacing and thereby cause the transmitted beam to focus at a different point in space.

References Cited
UNITED STATES PATENTS

| Re. 25,169 | 5/1962 | Glenn | 178—5.4 |
| 1,962,474 | 6/1934 | Baird | 178—6 |
| 3,063,331 | 11/1962 | Glenn | 350—161 |
| 3,085,469 | 4/1963 | Carlson | 350—160 X |
| 3,225,138 | 12/1965 | Montani | 178—7.2 |
| 3,259,014 | 7/1966 | Johnson et al. | 350—161 |
| 3,392,400 | 7/1968 | Lamberts et al. | 350—162 X |

OTHER REFERENCES

"An Ultrasonic Deflection System," Korpel et al., IEEE J. Quant. Elect., v. QE–1, No. 1, April 1965, pp. 60–61.

"Production of Fresnel Bone Plates for Extreme UV and Soft X-radiation," Mollenstedt et al., in X-ray Optics and X-ray Microanalysis, Academic Press, New York, 1963, pp. 73–99.

JEWELL H. PEDERSEN, Primary Examiner

R. J. WEBSTER, Assistant Examiner

U.S. Cl. X.R.

178—5.4; 350—161, 162

PO-1050
(5/69)

UNITED STATES PATENT OFFICE
CERTIFICATE OF CORRECTION

Patent No. 3,499,703          Dated March 10, 1970

Inventor(s) DOMINICK J. DE BITETTO

It is certified that error appears in the above-identified patent and that said Letters Patent are hereby corrected as shown below:

Column 2, line 23, after "material" insert --.--;

Column 4, line 54, cancel "pain"; and insert --gain--;

Column 6, line 4, after "for"; insert --generating--;

Column 6, line 49, cancel "Bone"; and insert --Zone--;

Signed and sealed this 8th day September 1970.

(SEAL)
Attest:

Edward M. Fletcher, Jr.
Attesting Officer

WILLIAM E. SCHUYLER, JR.
Commissioner of Patents